(12) United States Patent
Fiorilla et al.

(10) Patent No.: US 11,473,296 B2
(45) Date of Patent: Oct. 18, 2022

(54) FIELD IMPREGNATION EXPANSION JOINT SEAL SYSTEM AND METHOD OF USE

(71) Applicant: Schul International Co., LLC, Hudson, NH (US)

(72) Inventors: Nicholas A. Fiorilla, Hudson, NH (US); Michael M. Sebold, Cleveland Heights, OH (US)

(73) Assignee: Schul International Co., LLC, Hudson, NH (US)

( * ) Notice: Subject to any disclaimer, the term of this patent is extended or adjusted under 35 U.S.C. 154(b) by 146 days.

(21) Appl. No.: 17/077,281

(22) Filed: Oct. 22, 2020

(65) Prior Publication Data

US 2022/0127842 A1   Apr. 28, 2022

(51) Int. Cl.
*E04B 1/68* (2006.01)
*E01C 11/02* (2006.01)
*B32B 15/18* (2006.01)
*E01C 11/10* (2006.01)
*E01C 11/06* (2006.01)

(52) U.S. Cl.
CPC ............ *E04B 1/6816* (2013.01); *B32B 15/18* (2013.01); *E01C 11/02* (2013.01); *B32B 2266/06* (2013.01); *B32B 2307/3065* (2013.01); *B32B 2307/72* (2013.01); *E01C 11/06* (2013.01); *E01C 11/106* (2013.01)

(58) Field of Classification Search
None
See application file for complete search history.

(56) References Cited

U.S. PATENT DOCUMENTS

| | | |
|---|---|---|
| 8,317,444 B1 | 11/2012 | Hensley |
| 8,341,908 B1 | 1/2013 | Hensley et al. |
| 8,365,495 B1 | 2/2013 | Witherspoon |
| 8,739,495 B1 | 6/2014 | Witherspoon |
| 8,813,449 B1 | 8/2014 | Hensley et al. |
| 8,813,450 B1 | 8/2014 | Hensley et al. |
| 8,870,506 B2 | 10/2014 | Hensley et al. |
| 9,068,297 B2 | 6/2015 | Hensley et al. |
| 9,200,437 B1 | 12/2015 | Hensley et al. |
| 9,206,596 B1 | 12/2015 | Robinson |
| 9,322,163 B1 | 4/2016 | Hensley |
| 9,404,581 B1 | 8/2016 | Robinson |
| 9,528,262 B2 | 12/2016 | Witherspoon |
| 9,631,362 B2 | 4/2017 | Hensley et al. |
| 9,637,915 B1 | 5/2017 | Hensley et al. |
| 9,644,368 B1 | 5/2017 | Witherspoon |
| 9,670,666 B1 | 6/2017 | Witherspoon et al. |
| 9,689,157 B1 | 6/2017 | Hensley et al. |
| 9,689,158 B1 | 6/2017 | Hensley et al. |
| 9,739,049 B1 | 8/2017 | Robinson |
| 9,739,050 B1 | 8/2017 | Hensley et al. |

(Continued)

FOREIGN PATENT DOCUMENTS

EP    1118727 A1 *  7/2001  ............ E01C 11/106

*Primary Examiner* — Chinessa T. Golden
(74) *Attorney, Agent, or Firm* — Crain, Caton & James, P.C.; James E. Hudson, III

(57) ABSTRACT

An expansion joint seal system with a water-activated impregnation solute, and a body of an open-celled and resiliently-compressible foam, where the volume of the water-activated impregnation solute may be combined on-site and on-demand with water and manually impregnated into the body of the foam for insertion.

12 Claims, 2 Drawing Sheets

(56) References Cited

U.S. PATENT DOCUMENTS

| | | |
|---|---|---|
| 9,745,738 B2 | 8/2017 | Robinson |
| 9,765,486 B1 | 9/2017 | Robinson |
| 9,803,357 B2 | 10/2017 | Robinson |
| 9,840,814 B2 | 12/2017 | Robinson |
| 9,850,662 B2 | 12/2017 | Hensley |
| 9,856,641 B2 | 1/2018 | Robinson |
| 9,951,515 B2 | 4/2018 | Robinson |
| 9,963,872 B2 | 5/2018 | Hensley et al. |
| 9,982,428 B2 | 5/2018 | Robinson |
| 9,982,429 B2 | 5/2018 | Robinson |
| 9,995,036 B1 | 6/2018 | Robinson |
| 10,000,921 B1 | 6/2018 | Robinson |
| 10,060,122 B2 | 8/2018 | Robinson |
| 10,066,386 B2 | 9/2018 | Robinson |
| 10,066,387 B2 | 9/2018 | Hensley et al. |
| 10,081,939 B1 | 9/2018 | Robinson |
| 10,087,619 B1 | 10/2018 | Robinson |
| 10,087,620 B1 | 10/2018 | Robinson |
| 10,087,621 B1 | 10/2018 | Robinson |
| 10,072,413 B2 | 11/2018 | Hensley et al. |
| 10,125,490 B2 | 11/2018 | Robinson |
| 10,179,993 B2 | 1/2019 | Hensley et al. |
| 10,184,243 B2 | 1/2019 | Hamilton et al. |
| 10,203,035 B1 | 2/2019 | Robinson |
| 10,213,962 B2 | 2/2019 | Robinson |
| 10,227,734 B1 | 3/2019 | Robinson |
| 10,233,633 B2 | 3/2019 | Robinson |
| 10,240,302 B2 | 3/2019 | Robinson |
| 10,280,610 B1 | 5/2019 | Robinson |
| 10,280,611 B1 | 5/2019 | Robinson |
| 10,316,661 B2 | 6/2019 | Hensley et al. |
| 10,323,360 B2 | 6/2019 | Robinson |
| 10,323,407 B1 | 6/2019 | Robinson |
| 10,323,408 B1 | 6/2019 | Robinson |
| 10,323,409 B1 | 6/2019 | Robinson |
| 10,352,003 B2 | 7/2019 | Robinson |
| 10,352,039 B2 | 7/2019 | Robinson |
| 10,358,777 B2 | 7/2019 | Robinson |
| 10,358,813 B2 | 7/2019 | Robinson |
| 10,385,518 B2 | 8/2019 | Robinson |
| 10,385,565 B2 | 8/2019 | Robinson |
| 10,407,901 B2 | 9/2019 | Robinson |
| 10,422,127 B2 | 9/2019 | Hensley et al. |
| 10,480,136 B2 | 11/2019 | Robinson |
| 10,480,654 B2 | 11/2019 | Robinson |
| 10,519,651 B2 | 12/2019 | Hensley et al. |
| 10,533,315 B2 | 1/2020 | Robinson |
| 10,533,316 B1 | 1/2020 | Robinson |
| 10,538,883 B2 | 1/2020 | Robinson |
| 10,544,548 B2 | 1/2020 | Robinson |
| 10,544,582 B2 | 1/2020 | Hensley et al. |
| 10,557,263 B1 | 2/2020 | Robinson |
| 10,570,611 B2 | 2/2020 | Hensley et al. |
| 10,584,481 B2 | 3/2020 | Robinson |
| 10,676,875 B1 | 6/2020 | Robinson |
| 10,787,805 B2 | 9/2020 | Hensley et al. |
| 10,787,806 B2 | 9/2020 | Hensley et al. |
| 10,787,807 B1 | 9/2020 | Robinson |
| 10,787,808 B2 | 9/2020 | Robinson |
| 10,794,011 B2 | 10/2020 | Robinson |
| 10,794,055 B1 | 10/2020 | Robinson |
| 10,794,056 B2 | 10/2020 | Hensley et al. |
| 10,808,398 B1 | 10/2020 | Robinson |
| 2002/0035204 A1* | 3/2002 | Durham .............. C08L 63/00 525/107 |
| 2014/0219719 A1 | 8/2014 | Hensley et al. |
| 2014/0360118 A1 | 12/2014 | Hensley et al. |
| 2015/0068139 A1 | 3/2015 | Witherspoon |
| 2017/0130450 A1 | 5/2017 | Witherspoon |
| 2017/0159817 A1 | 6/2017 | Robinson |
| 2017/0191256 A1 | 7/2017 | Robinson |
| 2017/0226733 A1 | 8/2017 | Hensley et al. |
| 2017/0241132 A1 | 8/2017 | Witherspoon |
| 2017/0254027 A1 | 9/2017 | Robinson |
| 2017/0268222 A1 | 9/2017 | Witherspoon et al. |
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0016784 A1 | 1/2018 | Hensley et al. |
| 2018/0038095 A1 | 2/2018 | Robinson |
| 2018/0106001 A1 | 4/2018 | Robinison |
| 2018/0106032 A1 | 4/2018 | Robinison |
| 2018/0119366 A1 | 5/2018 | Robinison |
| 2018/0142465 A1 | 5/2018 | Robinison |
| 2018/0148922 A1 | 5/2018 | Robinison |
| 2018/0163394 A1 | 6/2018 | Robinison |
| 2018/0171564 A1 | 6/2018 | Robinison |
| 2018/0171625 A1 | 6/2018 | Robinison |
| 2018/0202148 A1 | 7/2018 | Hensley et al. |
| 2018/0238048 A1 | 8/2018 | Robinison |
| 2018/0266103 A1 | 9/2018 | Robinson |
| 2018/0274228 A1 | 9/2018 | Robinson |
| 2018/0300490 A1 | 10/2018 | Robinson |
| 2018/0347180 A1* | 12/2018 | Thomsen ............ E04D 13/1475 |
| 2018/0363292 A1 | 12/2018 | Robinson |
| 2018/0371746 A1 | 12/2018 | Hensley et al. |
| 2018/0371747 A1 | 12/2018 | Hensley et al. |
| 2019/0057215 A1 | 2/2019 | Robinson |
| 2019/0063608 A1 | 2/2019 | Robinson et al. |
| 2019/0071824 A1 | 3/2019 | Robinson |
| 2019/0107201 A1 | 4/2019 | Robinson |
| 2019/0108351 A1 | 4/2019 | Robinson |
| 2019/0194880 A1 | 6/2019 | Robinson |
| 2019/0194935 A1 | 6/2019 | Robinson |
| 2019/0211546 A1 | 7/2019 | Hensley et al. |
| 2019/0242070 A1 | 8/2019 | Robinson |
| 2019/0242117 A1 | 8/2019 | Robinson |
| 2019/0242118 A1 | 8/2019 | Robinson |
| 2019/0249420 A1* | 8/2019 | Robinson ................ E04B 1/948 |
| 2019/0249421 A1 | 8/2019 | Robinson |
| 2019/0249422 A1 | 8/2019 | Robinson |
| 2019/0249423 A1 | 8/2019 | Robinson |
| 2019/0266335 A1 | 8/2019 | Robinson |
| 2019/0271150 A1 | 9/2019 | Robinson |
| 2019/0271151 A1 | 9/2019 | Robinson |
| 2019/0323347 A1 | 10/2019 | Hensley et al. |
| 2020/0018061 A1 | 1/2020 | Robinson |
| 2020/0141067 A1 | 5/2020 | Robinson |
| 2020/0141113 A1 | 5/2020 | Robinson |
| 2020/0141114 A1 | 5/2020 | Hensley et al. |
| 2020/0248411 A1 | 8/2020 | Robinson et al. |
| 2020/0279046 A1 | 9/2020 | Robinson et al. |
| 2020/0325674 A1 | 10/2020 | Robinson |
| 2020/0325675 A1 | 10/2020 | Robinson |

* cited by examiner

FIELD IMPREGNATION EXPANSION JOINT SEAL SYSTEM AND METHOD OF USE

CROSS-REFERENCE TO RELATED APPLICATIONS

None.

STATEMENT REGARDING FEDERALLY SPONSORED RESEARCH OR DEVELOPMENT

Not Applicable.

BACKGROUND

Field

The present disclosure relates generally to systems for creating a durable water-resistant seal in the joint between adjacent panels in remote environments. More particularly, the present disclosure is directed to providing an expansion joint seal system which can be prepared on site and on demand which incorporates the benefit of resiliently-compressible foam and environmentally-dictated impregnations without the need to provide pre-prepared product in airtight packaging.

Description of the Related Art

Construction panels come in many different sizes and shapes and may be used for various purposes, including roadways, sideways, tunnels and other pre-cast structures. Where the construction panels are concrete, it is necessary to form a lateral gap or joint between adjacent panels to allow for independent movement, such in response to ambient temperature variations within standard operating ranges. These gaps are also used to permit moisture to be collected and expelled. If moisture is not effectively removed it can cause damage ranging from aesthetic in the form of white efflorescence buildup on surface to mold and major structural damage from freeze/thaw cycling.

Thus, expansion and movement joints are a necessary part of all areas of construction. The size and location of the movement depends on variables such as the amount of anticipated thermal expansion, load deflection and any expected seismic activity. Joint movement in a structure can be cyclical in design as in an expansion joint or in as a control joint to allow for the shrinkage of building components or structural settling. It is an important function of these expansion joints to not only move as intended but to remain in place through their useful lifespan.

Conventional joint sealants like gunnable sealants and most foam seals are designed to hold the water out of the structure or expansion joint. To be effective in this environment, fully functional, foam-based joint seals require a minimum compression ratio and impregnation density. It is known that higher densities and ratios can provide addition sealing benefits. It is well known to select a pre-compression density for the foam of 20-200 k/m³ where installed densities may be 80-800 kg/m³. Moreover, it is known to alter performance properties by the introduction, infusion, impregnation, or otherwise putting into some or all of the body of foam one or more fillers, water retardants, fire retardants, and/or combinations of the foregoing. Likewise, it is known that external coatings or membranes may be adhered to the exterior of the body of foam. These constructions are known to be used to satisfy the requirements of fire-rating standard such as UL 2079, DIN 4112-2, BS 476, EN1399, AS1503.4.

Because these bodies of foam contain and/or support fillers, retardants, coatings and membranes, and because these bodies of foam are often provided in pre-compressed form, the joint seal system is compressed to ⅓ to ⅕ its original width, packaged where the packaging maintains the compression of the body of foam, and sealed.

Moreover, as the joint becomes more distant from transportation hubs and avenues, delivery of packaged joint seal system becomes problematic. Packaging fails can occur, resulting in localized expansion of the joint seal system to an extent that the joint seal system becomes unusable. Even when not required, packaging may require the product be provided in sealed sticks or small rolls which cannot be readily shipped. Finally, because the body of foam is packaged with fillers, retardants, coatings and membranes, these may alter in response to environmental changes, such as drying and hardening.

It would be beneficial to provide a joint seal system which utilizes compressed foam and some combination of fillers, retardants, coatings and membranes and which does not require pre-compression and shipping in sealed packages.

SUMMARY

The present disclosure therefore meets the above needs and overcomes one or more deficiencies in the prior art.

The present disclosure provides an expansion joint seal system with a water-activated impregnation solute, and a body of an open-celled and resiliently-compressible foam, where the volume of the water-activated impregnation solute has a solute volume weight at least twice the weight of the body of the foam and where the water-activated impregnation solute is adapted to provide a peel strength of 1.71-28.55 lb/in (3.0-50.0 N/cm) at an outer surface of the body of the foam after the volume of the water-activated impregnation solute is combined with water and manually impregnated into the body of the foam.

The present disclosure further provides a method including providing a body of an open-celled and resiliently-compressible foam; providing a volume of a water-activated impregnation solute, the volume of the water-activated impregnation solute having a solute volume weight at least twice a body weight, the water-activated impregnation solute is adapted to provide a peel strength of 1.71-28.55 lb/in (3.0-50.0 N/cm) at an outer surface of the body of the foam; providing a volume of water sufficient to activate the water-activated impregnation solute; mixing the volume of water with the volume of a water-activated impregnation solute to provide a volume of a mixture; temporarily immersing an external surface of the body of the foam into the volume of the mixture; compressing and relaxing the body of the foam to coat a portion of the body of the foam with a portion of the volume of the mixture; withdrawing the body of the foam from the volume of the mixture; setting aside the body of the foam so the portion of the mixture that coats at least a portion of the body of the foam may dry, forming a joint seal system; laterally compressing the joint seal system along its length; inserting the joint seal system in a joint between a first substrate and a second substrate; and permitting the joint seal system to expand and adhere to the first substrate at the first substrate joint wall and to the second substrate at the second substrate joint wall.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

The present disclosure provides an expansion joint seal system 100 for use in less-accessible areas and the assembly and installation of the present embodiment.

Figure 1:
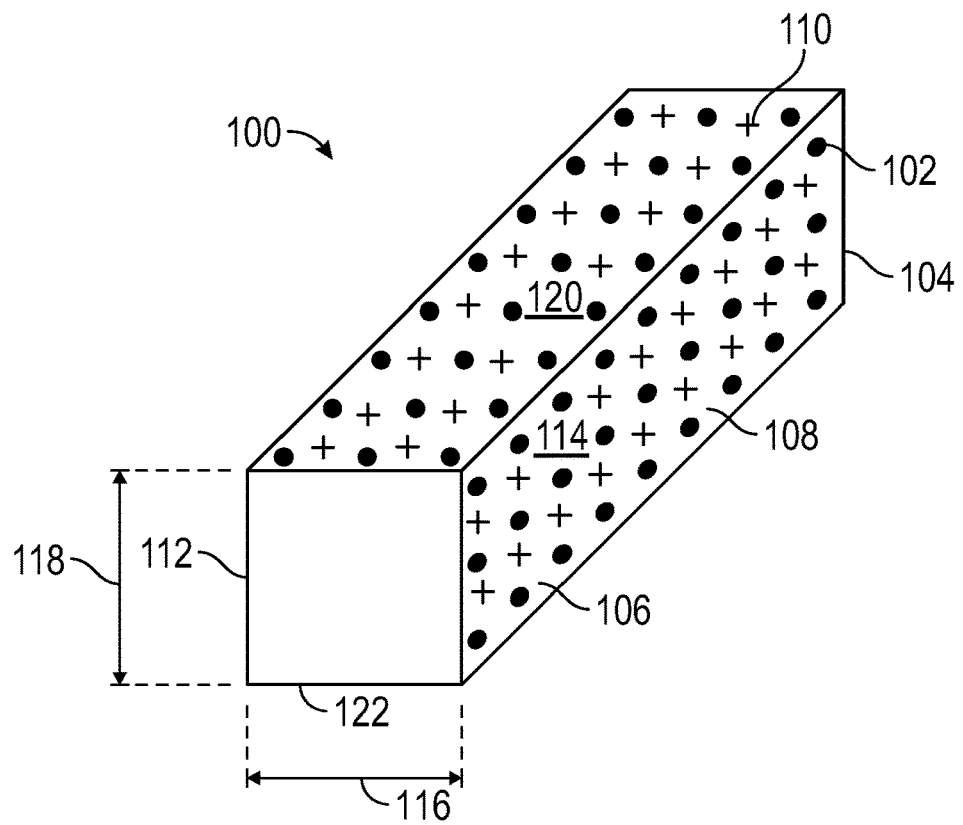
FIG. 1 provides an isometric view of an embodiment prior to installation.

Referring to FIG. 1, an isometric view of the present embodiment prior to installation is illustrated. The joint seal system 100 includes a volume of a water-activated impregnation solute 102, and a body 104 of a foam 106. The volume of the water-activated impregnation solute 102 has a solute volume weight and is adapted to provide a peel strength of 1.71-28.55 lb/in (3.0-50.0 N/cm) at an outer surface 108 of the body 104 of the foam 106 after the volume of the water-activated impregnation solute 102 manually impregnated into the body 104 of the foam 106.

The foam 106 is preferably open-celled and resiliently-compressible and may be unimpregnated with other constituents. The foam 106 may alternatively be impregnated, infused, or otherwise modified to support solid constituents when provided. The foam 106 may be polyurethane. The body 104 of the foam 106 has a body volume and a body weight. The body 104 may be provided as a rectangular prism or may be provided in any prismatic shape adapted to maintain contact with the two adjacent substrates of the joint. The foam 106 may be selected to have a high recovery characteristic, such that after the body 104 is compressed to 25% of a body width 116 measured from the body first surface 112 to the body second surface 114, i.e., 75%, for four 4 hours, the body 104 recovers to at least 90% of body width 116.

The water-activated impregnation solute 102 may be a mix of powders or a slurry. The water-activated impregnation solute 102 provides adhesion during field assembly. The water-activated impregnation solute 102 may be provided as an impregnation blend in powder form for combination with water. A powder-based impregnation blend may be beneficial as it can be provided in dry form to facilitate easier transport to the location of installation. A powder-based impregnation blend may further provide for a long-shelf life and ease of shipping. The water-activated impregnation solute 102 is dissolved into water, which preferably may be blended by hand, reducing the need for equipment, and particularly beneficial with there is little or no access to tools. The water-activated impregnation solute 102 may be selected to be non-toxic to contact to the persons mixing the water-activated impregnation solute 102 and installers of the joint seal system 100. After the water is evaporated, the remaining water-activated impregnation solute 102 remains, preferably at a solute volume weight at least twice the weight of the body 104 of the foam 106. When desired, the water-activated impregnation solute 102 may be as greater, or even greater, than six times the weight of the body 104 of the foam 106. Still after removal of the water, the water-activated impregnation solute 102 does not substantially reduce the expansion, contraction and shear movement of the body 104 of the foam 106. The body 104 of the foam 106 thus remains flexible. Moreover, the water-activated impregnation solute 102 may, when desired, be selected to provide other benefits, such as fire retardancy, may be hydrophobic, and may provide a barrier to the interior of the body 104 of the foam 106.

Figure 2:
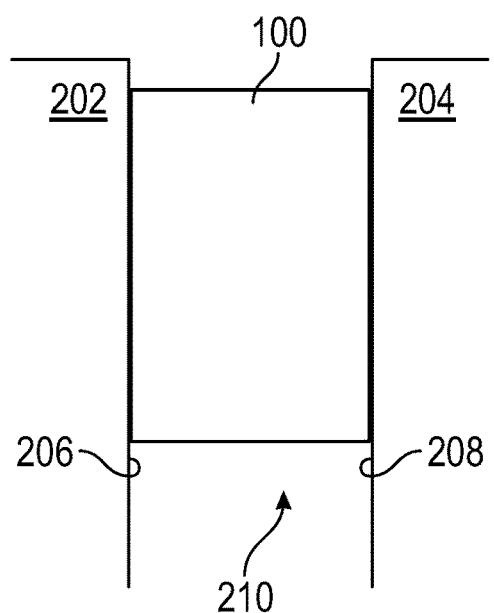
FIG. 2 provides an isometric view of an embodiment at installation.

Referring to FIG. 2, an isometric view of the present embodiment at installation is provided. The expansion joint system 100 is hand-compressed and imposed to the distance or gap between the first substrate 202 and a second substrate 204, and permitted to expand so the body first surface 112 contacts the first substrate joint wall 206 and the body second surface 114 contacts the second substrate joint wall 206. The body 104 may have a body first surface 112 adapted to contact a first substrate joint wall 206 and a body second surface 114 adapted to contact a second substrate joint wall 208. Additionally, the body 104 having a body height 118 from a body top surface 120 to a body bottom surface 122 which may be at least 3 times the body height 118. The expansion joint system 100 thus achieves a good and lasting adhesion to the first sidewall 202 and the second sidewall 204 and thus provides a seal to protect the joint 210 while ensuring the expansion joint system 100 is maintained in place.

The foam 106 may be selected to have a density of 1.25-1.87 lb/ft$^3$ (20-30 kg/m$^3$) before compression and may be selected so the body 104 has a compression set property at 50% compression from a mean joint size measured according to ASTM D3574-17 Test D of not more than 10. Preferably when relaxed, and prior to any compression, the body 104 of foam 106 may be less 25 lb/ft$^3$ (400 kg/m$^3$). The body 104 of foam 106 may be selected to have a density of at least 1.25 (20 kg/m$^3$) and not more than 18.75 lb/ft$^3$ (300 kg/m$^3$). When desired, the body 104 of foam 106 may be adapted to provide a density of 1.87-2.81 lb/ft$^3$ (30-45 kg/m$^3$) while contacting the first substrate 202 and the second substrate 204 or may be adapted to provide a density of 1.56-6.12 lb/ft$^3$ (25-98 kg/m$^3$) while contacting the first substrate 202 at the first substrate joint wall 206 and the second substrate 204 at the second substrate joint wall 208.

The body 104 of foam 106 may be selected to be a multiple of the size of the joint 210 and for compression of it for imposition. The body 104 may be adapted for a lateral compression to one-third of the body width 116 or to one-fifth the body width 116.

The foam 106 may have an air flow property measured according to ASTM D3574-17 Test G of at least 1 Cubic Feet per Minute (CFM) (0.028 m$^3$/min) and not more than 2 CFM (0.057 m$^3$/min). Air flow is a measure of cross-linking or for the flexible foam of the instant invention, the lack of cross-linking. ASTM D3574 was written based upon "The Dow Machine," as the term is used in the cellular foam materials industry. The Dow Machine is no longer produced. Generally, this refers to the volume of air which passes through a 1.0 inch (2.54 cm) thick section of foam measuring 2 inches (5.08 cm) by 2 inches (5.08 cm) square at 0.018 psi (125 Pa) of pressure. Units are expressed in cubic decimeters per second and converted to standard cubic feet per minute. This measurement follows ASTM D 3574 Test G.

When desired, a fire retardant impregnation 110 or other treatment may be adhered to the body 104 or included within the foam 106.

Figure 3:
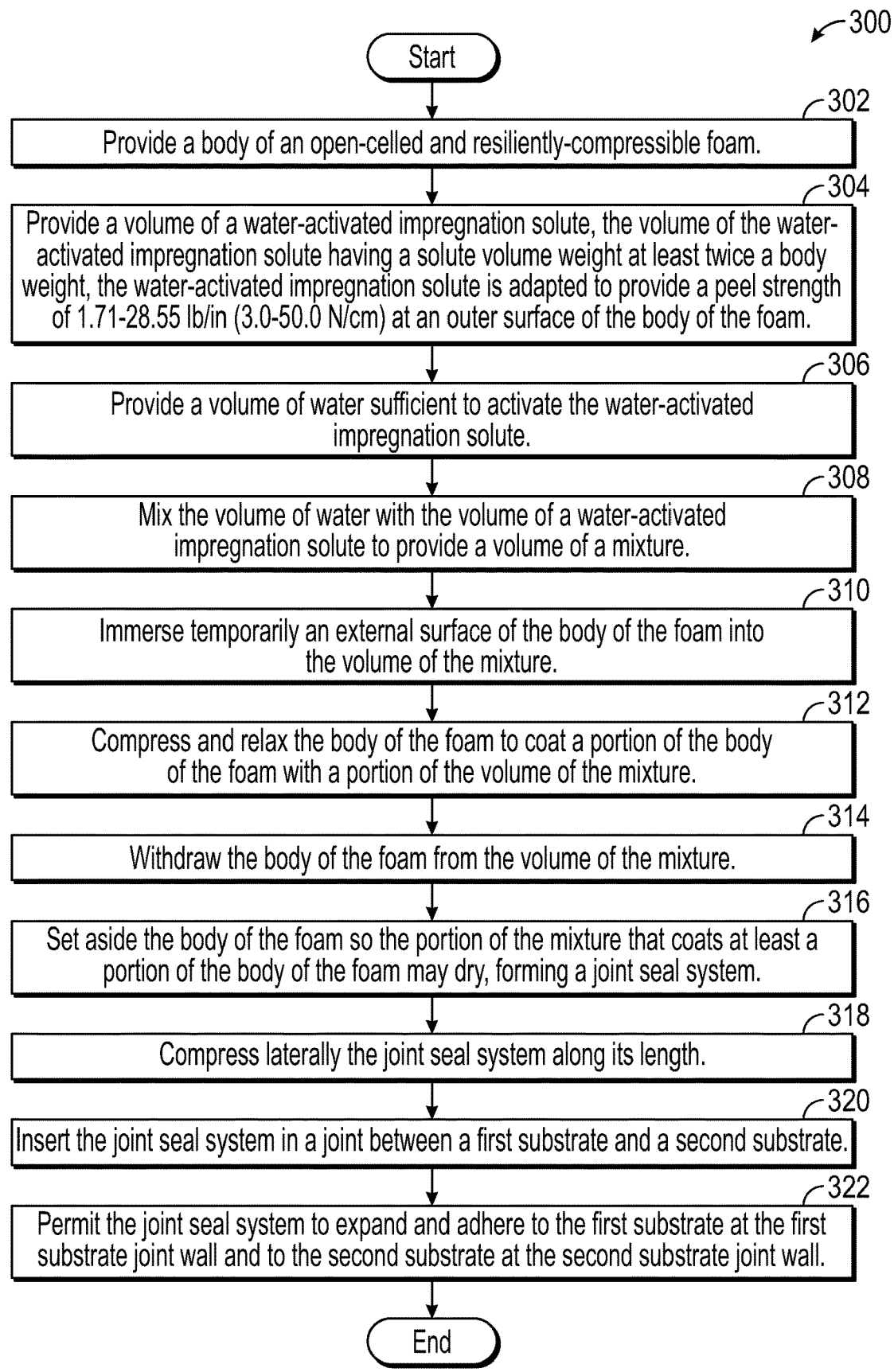
FIG. 3 provides a flow chart of the method of assembly and installation of an embodiment.

Referring to FIG. 3, a flow chart 300 of the method of assembly and installation of the present embodiment is provided. Steps 302, 304, 306, 308, 310, 312, 314, 316, 318, 320 and 322 provide for assembly and installation.

In step 302, a body 104 of an open-celled and resiliently-compressible foam 106 is provided, the body 104 of foam 106 having a body weight. The body 104 has several surfaces and, when provided as a rectangular prism, has six external surfaces. Other shapes may be used including cylindrical prisms and irregular shapes. When desired, the body 104 may be cut on-site to fit the width, depth, length, and changes in direction. The body width 116 may be three (3) times the width of the associated joint 210, or may be more, potentially as much as five (5) times the width of the associated joint 210, and may be less or more than the range, provided the body width 116 is greater than one times the width of the associated joint 210.

In step 304, a volume of a water-activated impregnation solute is provided, where the volume of the water-activated impregnation solute 102 has a solute volume weight at least twice the body weight and where the water-activated impregnation solute 102 is adapted to provide a peel strength of 1.71-28.55 lb/in (3.0-50.0 N/cm) at an outer surface 108 of the body 104 of the foam 106.

In step 306, a volume of water is provided sufficient to activate the water-activated impregnation solute 102.

In step 308, the volume of water is mixed with the volume of a water-activated impregnation solute 102 to provide a volume of a mixture.

In step 310, several of the external surfaces of the body 104 of the foam 106 are temporarily immersed into the volume of the mixture to impregnate at least a portion of the body 104 of foam 106. All six external surfaces, providing four sides and two ends, may be temporarily immersed. When desired, the entire body 104 of the foam 106 may be immersed into the volume of the mixture to impregnate the body 104 of foam 106.

In step 312, the body 104 of the foam 106 is impregnated by being sufficiently compressed and permitted to relax for a portion of the mixture to coat at least a portion of the body 104 of the foam 106.

In step 314, the body 104 of the foam 106 is withdrawn from the volume of the mixture.

In step 316, the body 104 of the foam 106 is immediately set aside so the portion of the mixture that coats at least a portion of the body 104 of the foam 106 may dry, completing the joint seal system 100. Step 316 is completed in no more than thirty (30) minutes.

In step 318, the joint seal system 100 is laterally compressed along its length. Step 318 is completed in no more than five (5) minutes.

In step 320, the joint seal system 100 is inserted in a joint 210 between a first substrate 202 and a second substrate 204. Step 320 is completed in no more than thirty (30) minutes.

In step 322, the joint seal system 100 is permitted to expand and adhere to the first substrate 202 at the first substrate joint wall 206 and to the second substrate 204 at the second substrate joint wall 208. The joint seal system 100 is installed within ninety (90) minutes of impregnation of the water-activated impregnation solute 102 into the body 104 of foam 106. The short timeline from impregnation to completed installation avoids the need for packaging, shipping, and storing and the issues associated with it. Beneficially, with the avoidance of packaging, shipping, and storing, the joint seal system 100 can be assembled on-site and on-demand, particularly beneficial when shipment and storage may create logistical issues.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

We claim:
1. A joint seal system, comprising:
a volume of a water-activated impregnation solute, and
a body of a foam,
the volume of the water-activated impregnation solute having a solute volume weight,
the water-activated impregnation solute adapted to provide a peel strength of 1.71-28.55 lb/in (3.0-50.0 N/cm) at an outer surface of the body of the foam when the volume of the water-activated impregnation solute is activated by water and manually impregnated into the body of the foam,
the foam being open-celled and resiliently-compressible,
the body of the foam having a body volume and a body weight,
the solute volume weight at least twice the body weight.

2. The joint seal system of claim 1, wherein the foam has a density in the range of 1.25-1.87 lb/ft$^3$.

3. The joint seal system of claim 2, wherein the body has a compression set property at 50% of a mean joint size measured according to ASTM D3574-17 Test D of not more than 10.

4. The joint seal system of claim 3, wherein the foam has an air flow property measured according to ASTM D3574-17 Test G of at least 1 CFM (0.028 m$^3$/min) and not more than 2 CFM (0.057 m$^3$/min).

5. The joint seal system of claim 4, further comprising a fire retardant impregnation adhered to the body.

6. The joint seal system of claim 3, wherein the body of foam is adapted to provide a density of 1.87-2.81 lb/ft$^3$ (30-45 kg/m$^3$) while contacting a first substrate and a second substrate.

7. The joint seal system of claim 3, wherein the body of foam is adapted to provide a density of 1.56-6.12 lb/ft$^3$ (25-98 kg/m$^3$) while contacting a first substrate and a second substrate.

8. The joint seal system of claim 1 wherein the body has a body first surface adapted to contact a first substrate joint wall and a body second surface adapted to contact a second substrate joint wall, the body having a body width measured from the body first surface to the body second surface, the body having a body height from a body top surface to a body bottom surface, the body width being at least 3 times the body height.

9. The joint seal system of claim 8 wherein the body is adapted for a lateral compression to one-third of the body width.

10. The joint seal system of claim 9 wherein the body of foam has a density of at least 20 kg/m³ and not more than 18.75 lb/ft³ (300 kg/m³).

11. The joint seal system of claim 8 wherein the body is adapted for a lateral compression to one-fifth the body width.

12. A method of installing a joint seal system, comprising:

providing a body of an open-celled and resiliently-compressible foam having a body volume;

providing a volume of a water-activated impregnation solute, the volume of the water-activated impregnation solute having a solute volume weight at least twice a body weight, the water-activated impregnation solute is adapted to provide a peel strength of 1.71-28.55 lb/in (3.0-50.0 N/cm) at an outer surface of the body of the foam when the volume of the water-activated impregnation solute is activated by water;

providing a volume of water sufficient to activate the water-activated impregnation solute;

activating the water-activated impregnation solute by mixing the volume of water with the volume of a water-activated impregnation solute to provide a volume of a mixture;

manually impregnating the volume of the water-activated impregnation solute into the body of the foam by temporarily immersing an external surface of the body of the foam into the volume of the mixture, then compressing and relaxing the body of the foam to coat a portion of the body of the foam with a portion of the volume of the mixture, then withdrawing the body of the foam from the volume of the mixture, then setting aside the body of the foam so the portion of the mixture that coats at least a portion of the body of the foam may dry, forming a joint seal system;

laterally compressing the joint seal system along its length;

inserting the joint seal system in a joint between a first substrate and a second substrate; and permitting the joint seal system to expand and adhere to the first substrate at the first substrate joint wall and to the second substrate at the second substrate joint wall.

\* \* \* \* \*